United States Patent [19]
Junji et al.

[11] Patent Number: 5,246,531
[45] Date of Patent: Sep. 21, 1993

[54] METHOD OF FABRICATING GLASS SUBSTRATE FOR DISK

[75] Inventors: Hirokane Junji; Inui Tetsuya, both of Nara; Mieda Michinobu, Shiki; Ohta Kenji, Kitakatsuragi, all of Japan

[73] Assignee: Sharp Kabushiki Kaisha, Osaka, Japan

[21] Appl. No.: 849,503

[22] Filed: Mar. 11, 1992

[30] Foreign Application Priority Data

Mar. 15, 1991 [JP] Japan ................................. 3-051324

[51] Int. Cl.⁵ ..................... B44C 1/22; C03C 15/00; C03C 25/06
[52] U.S. Cl. .................................. 156/643; 156/651; 156/654; 156/659.1; 156/663; 219/121.69; 430/321
[58] Field of Search ............ 156/643, 651, 654, 659.1, 156/663; 430/5, 321; 369/275, 277, 284, 285; 219/121.68, 121.69, 121.85; 204/192.32, 192.37

[56] References Cited

U.S. PATENT DOCUMENTS 4,818,648  4/1989  Ohta et al. ..................... 156/663 X
4,839,251  6/1989  Ohta et al. ..................... 430/5
5,008,176  4/1991  Kondo et al. .................. 156/663 X

FOREIGN PATENT DOCUMENTS 0108258  5/1984  European Pat. Off. .
0214824  3/1987  European Pat. Off. .
0241028  10/1987  European Pat. Off. .
3504969  8/1985  Fed. Rep. of Germany .

Primary Examiner—William A. Powell
Attorney, Agent, or Firm—David G. Conlin; George W. Neuner

[57] ABSTRACT

A method of fabricating a glass substrate for a disk including guide track portions and sector (or track) address portions of which grooves and pits have different depths, providing the steps of (i) forming a photoresist film over a glass substrate for an optical memory element, (ii) carrying out exposure to define a plurality of guide track portion formation areas and sector (or track) address portion formation areas interposed between the guide track portion formation areas, and carrying out development so as to cause the glass substrate in the address portion formation area to appear and to cause the photoresist film in the guide track portion formation area to remain as a first residual film, (iii) carrying out first etching to sink the glass substrate in the address portion formation area by a predetermined thickness such that a pit is formed and to remove the surface layer of the first residual film such that a second residual film is formed, (iv) carrying out first ashing to remove the second residual film so that the glass substrate in the guide track portion formation area appears, (v) carrying out second etching to form a groove in the guide track portion formation area and to further sink the pit in the address portion formation area so that a deeper pit is formed, and (vi) carrying out second ashing to remove a third residual photoresist film which remains between the deeper pit and the groove.

9 Claims, 3 Drawing Sheets

METHOD OF FABRICATING GLASS SUBSTRATE FOR DISK

BACKGROUND OF THE INVENTION

1. Field of the Invention

The present invention relates to a method of fabricating a glass substrate for a disk.

2. Description of the Prior Art

Recently, there has been needed an optical memory element as a high density mass memory element. The optical memory element can be classified into a read only memory, a write once memory and a rewritable memory according to its working form. The optical memory element to be used as the write once memory and rewritable memory uses a substrate for a disk. The substrate for a disk preliminarily comprises on a glass substrate guide tracks for guiding optical beams for recording, reading and erasing information to predetermined positions on the optical memory element, and track addresses for identifying track numbers. The track is divided into a plurality of sectors. In the case where information should be managed, sector addresses and the like are often provided in advance. As shown in FIG. 8, the depth of a guide track portion 1b is not equal to that of a sector (or track) address portion 1a, and the address portion 1a is provided between the guide track portions 1b. The reason is as follows. In the case where the optical beams are tracked by an optical differential method, it is preferred that the depth of the guide track portion approximates $\lambda/(8\times n)$ and the depth of the address portion approximates $\lambda/(4\times n)$ (where $\lambda$ is a wavelength of light to be used and n is a refractive index of a substrate). As shown in FIGS. 9 to 13, there has been proposed a technique for forming the guide track, the sector (or track) address and the like on a glass substrate by a contact printing method and a dry etching method.

Referring to the technique described above, a photomask is used for forming a glass substrate for a disk by the contact printing method and the dry etching method. The photomask has such a shape that a quantity of light radiated onto the guide track portion and sector (or track) address portion on a photoresist film is varied. This technique will be summarized with reference to FIGS. 9 to 13.

As shown in FIG. 9, a positive type photoresist film 2 is provided on a glass substrate 1, and prebaking is then carried out.

As shown in FIG. 10, a photomask 3 having a thin film 4 for a mask is caused to contact the photoresist film 2 through the thin film 4. In this case, the thin film 4 is not provided in a formation area A1 of a sector (or track) address portion 1a. Consequently, a quantity of transmitted light is not reduced. The thin film 4 remains at a thickness of about 10 to 200 Å in a formation area B1 of a guide track portion 1b. Consequently, a quantity of transmitted light in the formation area B1 is smaller than in the formation area A1. Then, ultraviolet rays 5 are radiated to expose the photoresist film 2 provided below the photomask 3 (see FIG. 10). Thereafter, the photomasks 3 and 4 are removed.

As shown in FIG. 11, the photoresist film 2 thus exposed is developed, and postbaking is then carried out. Exposure is fully carried out by strong light in a formation area A2 of the address portion 1a on the photoresist film 2. Consequently, the photoresist film 2 is completely developed so that the glass substrate 1 appears. In a formation area B2 of the guide track portion 1b on the photoresist film 2, the exposure is carried out by weaker light than in the formation area A2. Consequently, development is stopped halfway. As a result, the photoresist film 2 remains by a thickness according to a quantity of transmitted light in the formation area B1 on the thin film 4, so that the glass substrate 1 does not appear. The reference numeral 22a denotes a residual photoresist film.

As shown in FIG. 12, the glass substrate 1 is subjected to dry etching using gas such as $CF_4$ or $CHF_3$. The photoresist film 2 shown in FIG. 11 is also etched simultaneously. Consequently, when etching is started, the etching of the glass substrate 1 is advanced in the formation area A2 so that a deep pit 11a is formed on the glass substrate 1. The residual photoresist film 22a is etched in the formation area B2. When the glass substrate 1 appears, the etching of the glass substrate 1 is advanced. Consequently, there is formed a groove 11b which is shallower than the pit 11a in the formation area A2. The reference numeral 22b denotes a photoresist film which remains when the etching is completed.

As shown in FIG. 13, the photoresist film 22b remaining on the glass substrate 1 is removed to form on the glass substrate 1 the address portion 1a as a deep pit 111 and the guide track portion 1b as a shallow groove 112. Thus, there is formed a glass substrate 11 for a disk on which the address portion 1a and guide track portion 1b have different depths.

The depth of the groove 112 forming the guide track portion 1b is defined by the thickness of the photoresist film 22a remaining on the guide track portion 1b, and the etching speeds of the photoresist film 2 including the residual photoresist film 22a and the glass substrate 1 as shown in FIG. 11. The thickness of the photoresist film 22a is defined by a quantity of transmitted light and developing conditions in the guide track portion 1b. Accordingly, it is difficult to uniformly form pits and grooves with good reproducibility.

It is an object of the present invention to provide a method of fabricating a glass substrate for a disk wherein groove-shaped guide track portions and pit-shaped sector (or track) address portions interposed between the guide track portions can uniformly be formed.

SUMMARY OF THE INVENTION

The present invention provides a method of fabricating a glass substrate for a disk including guide track portions and sector (or track) address portions of which grooves and pits have different depths, comprising the steps of (i) forming a photoresist film over a glass substrate for an optical memory element, (ii) carrying out exposure to define a plurality of guide track portion formation areas and sector (or track) address portion formation areas interposed between the guide track portion formation areas, and carrying out development so as to cause the glass substrate in the address portion formation area to appear and to cause the photoresist film in the guide track portion formation area to remain as a first residual film, (iii) carrying out first etching to sink the glass substrate in the address portion formation area by a predetermined thickness such that a pit is formed and to remove the surface layer of the first residual film such that a second residual film is formed, (iv) carrying out first ashing to remove the second residual film so that the glass substrate in the guide track portion formation area appears, (v) carrying out second etching to form a groove in the guide track portion formation area and to further sink the pit in the address portion formation area so that a deeper pit is formed, and (vi) carrying out second ashing to remove a third residual photoresist film which remains between the deeper pit and the groove.

DETAILED DESCRIPTION OF THE PREFERRED EMBODIMENT

A glass substrate for a disk according to the present invention is used as a substrate for an optical memory element or as a substrate for a master plate for preparing a stamper to be used for injection molding.

Figure 2:
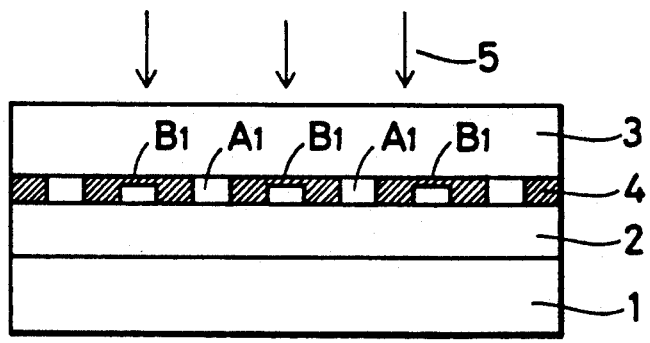
FIG. 2 is a view showing a second step according to the embodiment of the present invention.
Figure 3:
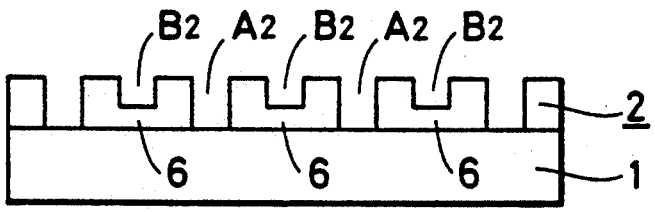
FIG. 3 is a view showing a third step according to the embodiment of the present invention.

At first, a photoresist film 2 on a glass substrate 1 is exposed (see FIG. 2). Then, development is carried out so that the surface of the glass substrate 1 appears in an address portion formation area A2 and the photoresist film 2 remains as a first residual film 6 on the surface of the glass substrate 1 in a guide track portion formation area B2 as shown in FIG. 3.

It is preferred that exposure is carried out by radiating ultraviolet rays 5 onto the photoresist film 2 with the use of photomasks 3 and 4, or by a laser cutting method using laser beams. The photomasks 3 and 4 can completely remove the photoresist film 2 in the address portion formation area and can stop the removal of the photoresist film 2 halfway in the guide track portion formation area (see FIG. 2)

The photomasks 3 and 4 are preferably comprised of a quartz substrate 3 and a metallic pattern 4 such as tantalum (Ta), chromium (Cr) or titanium (Ti) which is formed on the quartz substrate 3.

Referring to the laser cutting method, Ar ion laser beams having a large quantity of light for exposing the address portion formation area and Ar ion laser beams having a small quantity of light for exposing the guide track portion formation area are radiated onto a photoresist plane, and scan the photoresist plane while rotating the glass substrate so that each formation area is exposed like spirals.

The glass substrate 1 which includes the photoresist film 2 having the first residual film 6 is subjected to first etching. Consequently, the glass substrate 1 in an address portion formation area A3 is sunk by a predetermined thickness. In a guide track portion formation area B3, the first residual film 6 is removed to cause a second residual film 7 to remain (see FIG. 4). The first etching is a known method, for example, dry etching carried out at a power of 1500 W and a pressure of 12 mTorr in a plasma atmosphere using gas such as $CF_4$ or $CHF_3$.

Figure 5:
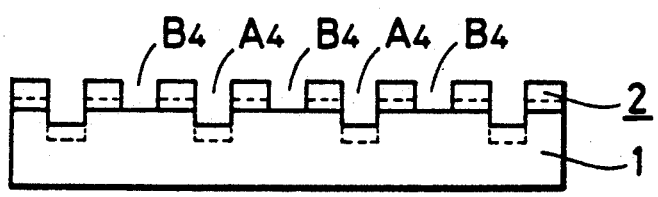
FIG. 5 is a view showing a fifth step according to the embodiment of the present invention.

Then, the second residual film 7 is removed by first ashing so as to cause the surface of the glass substrate 1 to appear in a guide track portion formation area B4 (see FIG. 5).

The first ashing serves to remove an organic material such as a photoresist film. By the first ashing, the second residual film 7 can be removed without depending on the ununiformity of thickness distribution of the first and second residual films 6 and 7. Consequently, the surface of the glass substrate 1 can completely appear in the guide track portion formation area B4. More specifically, the glass substrate 1 cannot be removed by the first ashing. Accordingly, pits in an address portion formation area A4 can be defined only by the first etching without depending on the selection ratio of the glass substrate to the photoresist film (for example, 1:1 or 1:2), and the thicknesses of the first and second residual films 6 and 7.

The first ashing is a known method, for example, plasma etching carried out at a power of 200 W and a pressure of 10 to 50 mTorr in an oxygen plasma atmosphere.

Figure 6:
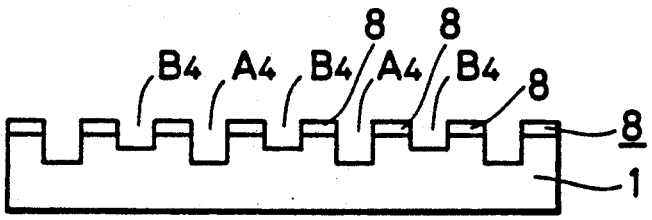
FIG. 6 is a view showing a sixth step according to the embodiment of the present invention.
Figure 7:
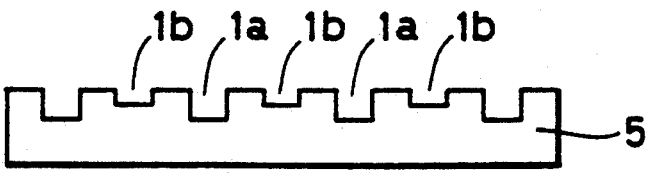
FIG. 7 is a view showing a seventh step according to the embodiment of the present invention.
Figure 8:
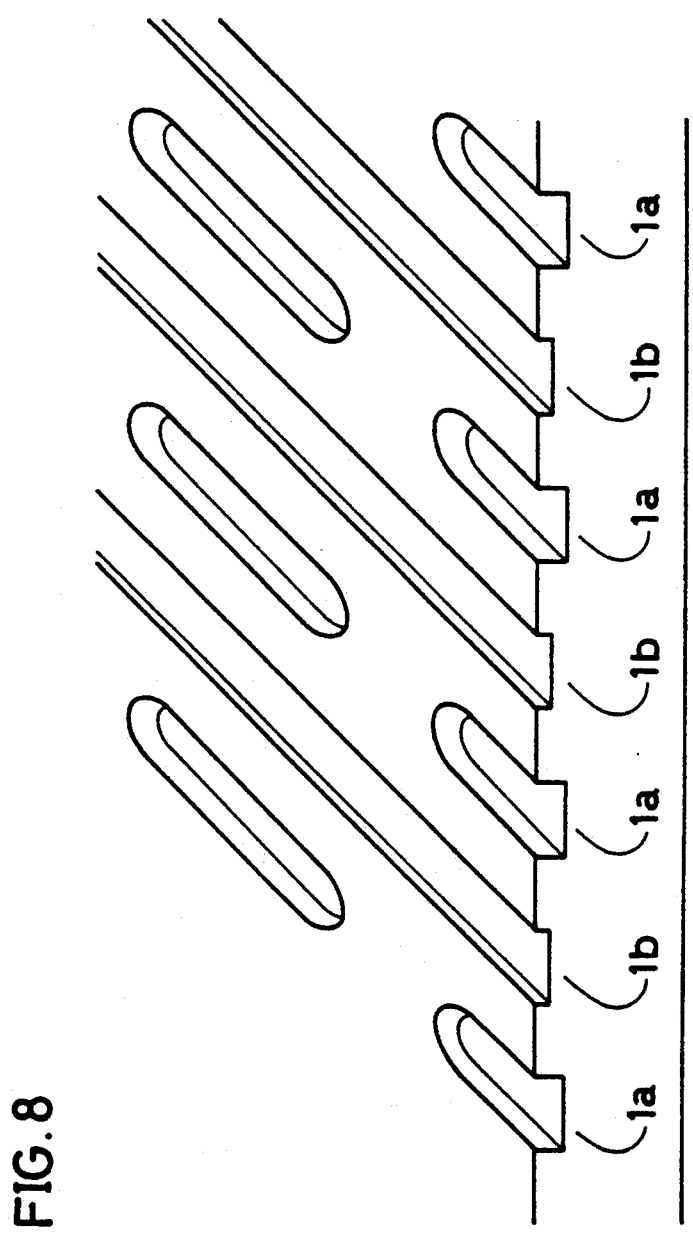
FIG. 8 is a view showing the structure of a main part of a glass substrate for a disk fabricated.
Figure 9:
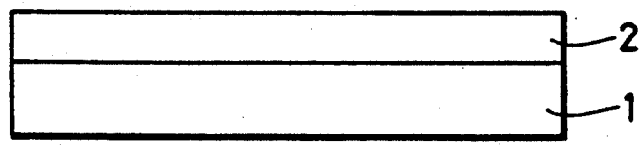
FIG. 9 is a view showing a first step according to the prior art.
Figure 10:
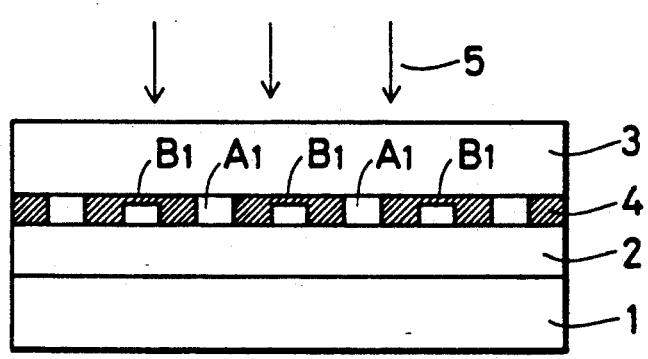
FIG. 10 is a view showing a second step according to the prior art.
Figure 11:
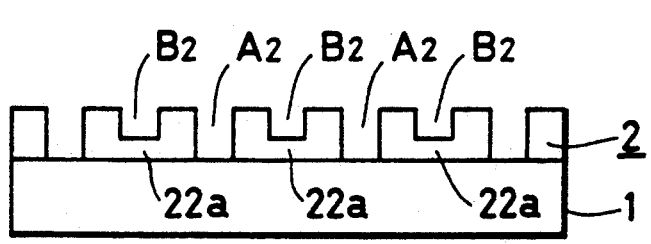
FIG. 11 is a view showing a third step according to the prior art.
Figure 12:
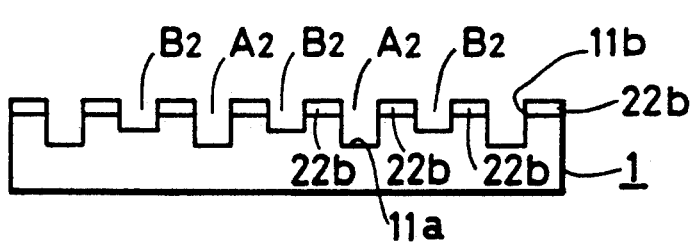
FIG. 12 is a view showing a fourth step according to the prior art.
Figure 13:
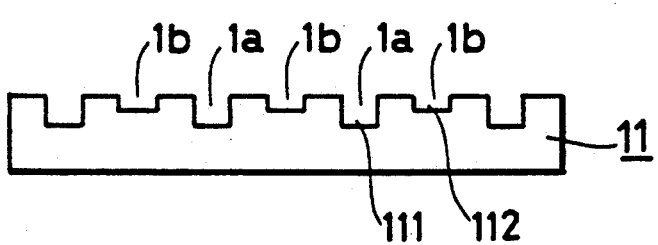
FIG. 13 is a view showing a fifth step according to the prior art.

Then, second etching is carried out to sink by a predetermined thickness the glass substrate 1 which is caused to appear by the first ashing. Consequently, there is formed a shallow groove as a guide track portion 1b in the guide track portion formation area B4. At the same time, the glass substrate 1 is sunk by a predetermined thickness in the address portion formation area A3 so as to form a deep pit as an address portion 1a (see FIG. 6). The glass substrate 1 is sunk by the second etching. More specifically, the guide track portion 1b can be defined only by the second etching without depending on the selection ratio of the glass substrate to the photoresist film, and the thicknesses of the first and second residual films 6 and 7. At this time, the address portion 1a forms a pit having a desired depth by the first and second etching.

Subsequently, a third residual film 8 (see FIG. 6) provided between the address portion formation area A4 and the guide track portion formation area B4 is removed by second ashing. In this case, the depths of the address portion 1a and guide track portion 1b are not affected by the second ashing.

According to the present invention, the depths of the guide track portion and address portion can be defined only by the first and second etching without depending on the selection ratio of the glass substrate to the photoresist film, and the thicknesses of the first and second residual films. Consequently, the guide track portion and address portion can have grooves and pits uniformly formed on the glass substrate with good reproducibility.

A method of fabricating a glass substrate for a disk according to the present invention will be described in detail with reference to the drawings. FIGS. 1 to 7 show fabricating steps according to the present invention.

Figure 1:
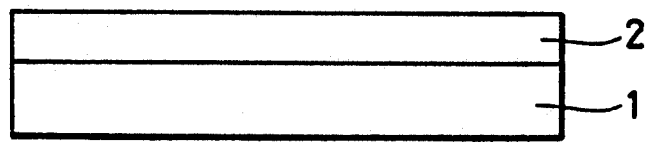
FIG. 1 is a view showing a first step according to an embodiment of the present invention.

As shown in FIG. 1, a positive type photoresist film 2 is provided on a glass substrate 1 as a glass substrate for a disk. Then, prebaking is carried out.

As shown in FIG. 2, a photomask 3 is caused to contact the photoresist film 2 through a thin film 4 for a mask. Ultraviolet rays 5 are radiated onto the photomask 3 so as to expose the photoresist film 2. In this case, the thin film 4 is not provided in a formation area A1 of a sector (or track) address portion 1a. Consequently, a quantity of light transmitted to the photoresist film 2 is not reduced. The thin film 4 remains at a thickness of about 10 to 200 Å in a formation area B1 of a guide track portion 1b. Consequently, the quantity of light transmitted to the photoresist film 2 is reduced.

After the photomasks 3 and 4 are removed, the exposed photoresist film 2 is developed as shown in FIG. 3. Then, postbaking is carried out. A formation area A2 of the address portion 1a on the photoresist film 2 is fully exposed by strong light. Consequently, the photoresist film 2 is completely developed so that the glass substrate 1 appears. A formation area B2 of the guide track portion 1b on the photoresist film 2 is exposed by weaker light than in the formation area A2 of the address portion 1a. Consequently, the development of the photoresist film 2 is stopped halfway. The photoresist film 2 in the formation area B2 of the guide track portion 1b remains as a first residual film 6. The first residual film 6 is formed at a thickness according to a quantity of transmitted light in the formation area B1. The above-mentioned steps are the same as those of the prior art.

Figure 4:
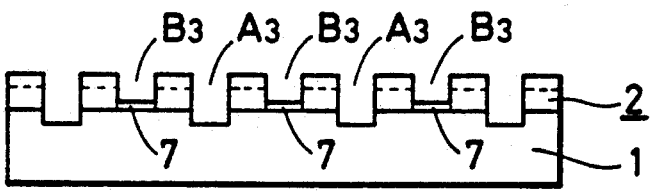
FIG. 4 is a view showing a fourth step according to the embodiment of the present invention.

Subsequently, the glass substrate 1 including the photoresist film 2 is entirely etched as shown in FIG. 4. Consequently, the glass substrate 1 in a formation area A3 of the address portion 1a and the first residual film 6 in a formation area B3 of the guide track portion 1b are simultaneously etched by a thickness of 200 to 800 Å. In this case, the first residual film 6 in the formation area B3 is not completely removed so as to remain as a second residual film 7.

Then, the second residual film 7 in the formation area B3 of the guide track portion 1b is removed by ashing (first ashing). Consequently, the glass substrate 1 in the formation area B3 of the guide track portion 1b appears (see FIG. 5). In this case, the glass substrate 1 in the formation area A3 which has appeared is not removed. In this state, the glass substrate 1 appears in formation areas A4 and B4. The glass substrate 1 in other areas is covered by the photoresist film 2.

Thereafter, the glass substrate 1 including the photoresist film 2 is entirely etched (second etching). Consequently, a portion in which the glass substrate 1 appears, i.e., the glass substrate 1 in the formation areas A4 and B4 of the address portion 1a and guide track portion 1b is also etched by a thickness of 300 to 1000 Å (see FIG. 6). In this case, the photoresist film 2 is removed by a thickness of about 300 to 1000 Å so as to remain as a third residual film 8.

Finally, only the third residual film 8 is removed by ashing (second ashing). Consequently, there is formed a glass substrate 5 for a disk having address portions 1a and guide track portions 1b of which pits and grooves have different depths. In this case, the pit of the address portion 1a has a depth of 1400 Å and the groove of the guide track portion 1b has a depth of 700 Å. These depths are set to $\lambda/3n$ in the guide track portion 1b and $\lambda/4n$ in the address portion 1a (where $\lambda$ is a wavelength of a laser beam radiated onto the glass substrate 5 and n is a refractive index of a substrate).

According to the present invention, a new etching process is incorporated. Consequently, the depths of the pit and groove of the address portion and guide track portion are defined only by etching. Thus, there can be fabricated a glass substrate for a disk on which address and guide track portions are uniformly formed with good reproducibility. The address and guide track portions include pits and grooves which have different depths, respectively.

What is claimed is:

1. A method of fabricating a glass substrate for a disk including guide track portions and sector (or track) address portions of which grooves and pits have different depths, comprising the steps of;
   (i) forming a photoresist film over a glass substrate for an optical memory element,
   (ii) carrying out exposure to define a plurality of guide track portion formation areas and sector (or track) address portion formation areas interposed between the guide track portion formation areas, and carrying out development so as to cause the glass substrate in the address portion formation area to appear and to cause the photoresist film in the guide track portion formation area to remain as a first residual film,
   (iii) carrying out first etching to sink the glass substrate in each address portion formation area by a predetermined thickness such that a pit is formed and to remove the surface layer of the first residual film such that a second residual film is formed,
   (iv) carrying out first ashing to remove the second residual film so that the glass substrate in each guide track portion formation area appears,
   (v) carrying out second etching to form a groove in the guide track portion formation area and to further sink said pit in the address portion formation area so that a deeper pit is formed, and
   (vi) carrying out second ashing to remove a third residual photoresist film which remains between the deeper pit and the groove.

2. The method of fabricating a glass substrate for a disk according to claim 1, wherein the first and second ashing is carried out by means of a parallel plate type etching apparatus which is used for the first and second etching.

3. The method of fabricating a glass substrate for a disk according to claim 1, wherein the first and second ashing is carried out in an oxygen plasma atmosphere.

4. The method of fabricating a glass substrate for a disk according to claim 1, wherein the first and second etching is carried out in a plasma atmosphere using gas such as $CF_4$ or $CHF_3$.

5. The method of fabricating a glass substrate for a disk according to claim 1, wherein the exposure is carried out after a photomask is formed, the photomask being capable of completely removing the photoresist film in the sector (or track) address portion formation area and stopping the removal of the photoresist film halfway in the guide track portion formation area.

6. The method of fabricating a glass substrate for a disk according to claim 5, wherein the photomask is comprised of a quartz substrate and a metallic pattern such as tantalum (Ta), chromium (Cr) or titanium (Ti) which is formed on the quartz substrate.

7. The method of fabricating a glass substrate for a disk according to claim 1, wherein the exposure is carried out by a laser cutting method using two Ar ion laser beams.

8. The method of fabricating a glass substrate for a disk according to claim 1, wherein the glass substrate for a disk is used as a substrate for an optical memory element.

9. The method of fabricating a glass substrate for a disk according to claim 1, wherein the glass substrate for a disk is used as a substrate for a master plate for preparing a stamper to be used for injection molding.

* * * * *